UNITED STATES PATENT OFFICE.

STEN LILJA, OF BAYONNE, NEW JERSEY, ASSIGNOR OF ONE-THIRD TO J. W. HUGO HAMILTON, OF ST. GEORGE, STATEN ISLAND, NEW YORK, AND ONE-THIRD TO NILS V. HANSELL, OF CALDWELL, NEW JERSEY.

PROCESS OF REDUCING HEMATITE TO MAGNETIC IRON OXID.

1,001,536.     Specification of Letters Patent.     Patented Aug. 22, 1911.

No Drawing.     Application filed October 25, 1910. Serial No. 589,051.

*To all whom it may concern:*

Be it known that I, STEN LILJA, a subject of the King of Sweden, and residing in Bayonne, in the county of Union and State of New Jersey, have invented a certain new and Improved Process of Reducing Hematite to Magnetic Iron Oxid, of which the following is a specification.

My invention has as its principal object a process of obtaining magnetic iron oxid, *e. g.* magnetite ($Fe_3O_4$), from a mixture of hematite ($Fe_2O_3$) and a natural sulfur compound of iron and particularly to a process in which this is accomplished by mixing with the hematite a suitable quantity of pyrrhotite (FeS) or pyrites ($FeS_2$) both of which occur in large quantities in certain sections of the hemisphere, and causing a reaction between the same whereby magnetic iron oxid is produced which may be readily concentrated magnetically and briqueted or nodulized for use in the blast or open hearth furnace.

While as stated, I contemplate principally the use of the natural sulfur compound of iron mentioned, the desired reaction may be obtained by mixing the hematite with sulfur or subjecting the same to the action of sulfurous acid gas under suitable conditions.

Up to the present time the magnetic separation of close grained low grade hematites has been accompanied by practically insurmountable difficulties by reason of the slight difference in permeability between the iron mineral and the gangue minerals of the ore. It has been proposed to reduce the hematite by heating it with a small amount of carbon, and experimentally this has been successfully accomplished, but practically it has not met with success for various reasons.

The present invention contemplates primarily the addition to a quantity of hematite ($Fe_2O_3$), of a suitable proportion of a natural sulfur compound of iron, such as pyrites ($FeS_2$) or pyrrhotite (FeS), and then heating the mixture in finely ground condition to a temperature suitable for the desired reaction. It is preferable to first crush the ores and after determining the proper proportions then grind them together, since by this method a very intimate mixture is secured which is favorable to the reaction. The proportions of the mixture vary with the natural sulfur compound of iron which is employed and the richness of the crude ores. Furthermore the necessary proportions vary with the amount of oxygen admitted during the reaction. The temperatures at which the reaction may be obtained are various, but I have discovered that it may be successfully carried out at as low a temperature as 500° C.

The following equations illustrate the reaction. Using pyrites ($FeS_2$) as the natural sulfur compound, the reactions in a closed chamber are, principally, as follows:—

($1^a$)    $16Fe_2O_3 + FeS_2 = 11Fe_3O_4 + 2SO_2$.

If the reaction be carried on in the presence of a greater or less quantity of oxygen the reactions will vary as illustrated in the following equations:—

($1^b$)    $10Fe_2O_3 + FeS_2 + O_2 = 7Fe_3O_4 + 2SO_2$ ($1^c$)    $8Fe_2O_3 + 2FeS_2 + 4O_2 = 6Fe_3O_4 + 4SO_2$ ($1^d$)    $2Fe_2O_3 + 2FeS_2 + 5O_2 = 2Fe_3O_4 + 4SO_2$.

If pyrrhotite (FeS) be used as the natural sulfur compound the chief reactions in a closed chamber are:—

($2^a$)    $10Fe_2O_3 + FeS = 7Fe_3O_4 + SO_2$, while with oxygen present the reactions are:—

($2^b$)    $8Fe_2O_3 + 2FeS + 2O_2 = 6Fe_3O_4 + 2SO_2$ ($2^c$)    $10Fe_2O_3 + 4FeS + 5O_2 = 8Fe_3O_4 + 4SO_2$ ($2^d$)    $2Fe_2O_3 + 2FeS + 3O_2 = 2Fe_3O_4 + 2SO_2$.

The formula FeS for pyrrhotite, above employed, is the one commonly employed for simplicity by metallurgists, though for strict accuracy the formula $Fe_nS_n + 1$ is preferred.

During the reaction considerable heat is generated within the mixture by the sulfur present, so that the amount of heat applied to bring the mixture to the required temperature is thereby materially reduced.

If sulfur dioxid be employed in place of the natural iron sulfur compound, the principal reactions are illustrated by the following equation:—

(3)    $3Fe_2O_3 + SO_2 = 2Fe_3O_4 + SO_3$.

Several of the roasting kilns now in general use may be employed for carrying out the process, for instance the rotary kilns partially closed at both ends through which the ore is slowly passed during the roasting. A modified type of the mechanically operated pyrites burner may also be employed.

The resulting product may contain an appreciable amount of sulfur. This however is no detriment inasmuch as being finely ground it must be nodulized or briqueted before being introduced into the iron furnaces, and the sulfur will be expelled in the nodulizing or briqueting furnace.

Various other modifications of the process will readily suggest themselves, and I do not limit myself to the example given.

I claim as my invention:—

1. The process of reducing non-magnetic iron oxid to magnetic iron oxid which consists in mixing therewith a suitable proportion of a natural sulfur compound of iron and bringing the mixture in finely divided condition to reaction temperature, substantially as described.

2. The process of obtaining magnetic iron oxid which consists in heating to reaction temperature a finely divided mixture of hermatite and a sulfur compound of iron oxid as pyrites or pyrrhotite, whereby said iron compounds are reduced to magnetic oxid of iron, substantially as described.

3. The process of obtaining magnetic iron oxid which consists in grinding together suitable proportions of hematite and a natural sulfur compound of iron such as pyrites or pyrrhotite, and bringing the mixture to reaction temperature, substantially as described.

4. The process of reducing low grade iron oxid to magnetic iron oxid which consists in combining sulfur with a portion of its oxygen content at an elevated temperature whereby said portion is eliminated in the form of a gas and the ore reduced to magnetic oxid of iron, substantially as described.

5. The process of reducing non-magnetic iron oxid to magnetic iron oxid which consists in causing a predetermined proportion of a natural sulfur compound of iron to react therewith in finely divided condition, substantially as described.

In testimony whereof I have signed my name to this specification, in the presence of two subscribing witnesses.

STEN LILJA.

Witnesses:
N. V. HANSELL,
WM. I. BATEMAN.

---

Copies of this patent may be obtained for five cents each, by addressing the "Commissioner of Patents. Washington, D. C."